Oct. 9, 1923.
H. L. INGERSOLL
1,470,082
BOOSTER MOTOR FOR LOCOMOTIVES
Filed June 20, 1919    4 Sheets-Sheet 1
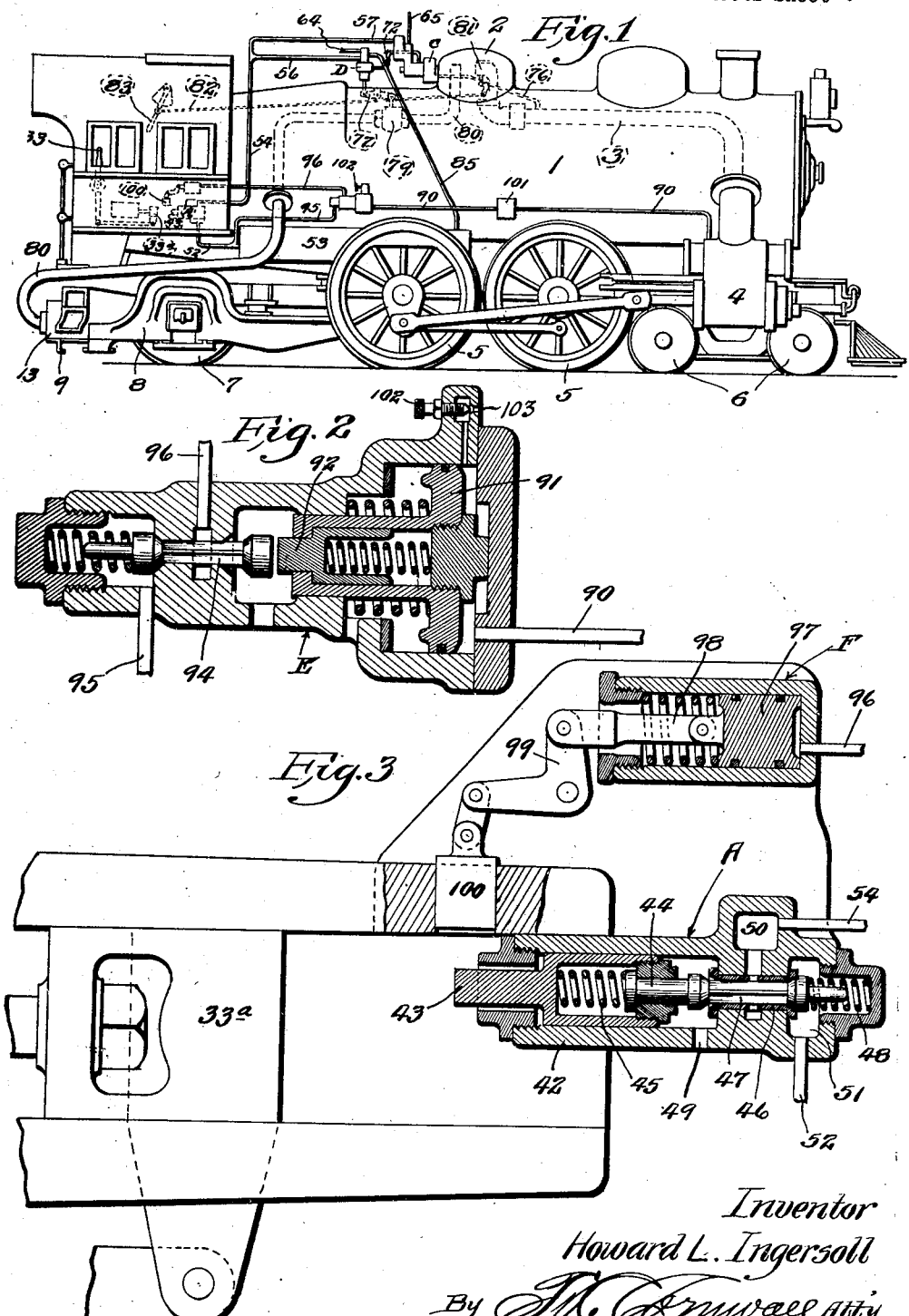
Inventor
Howard L. Ingersoll
By J. M. Cornwall, Atty.

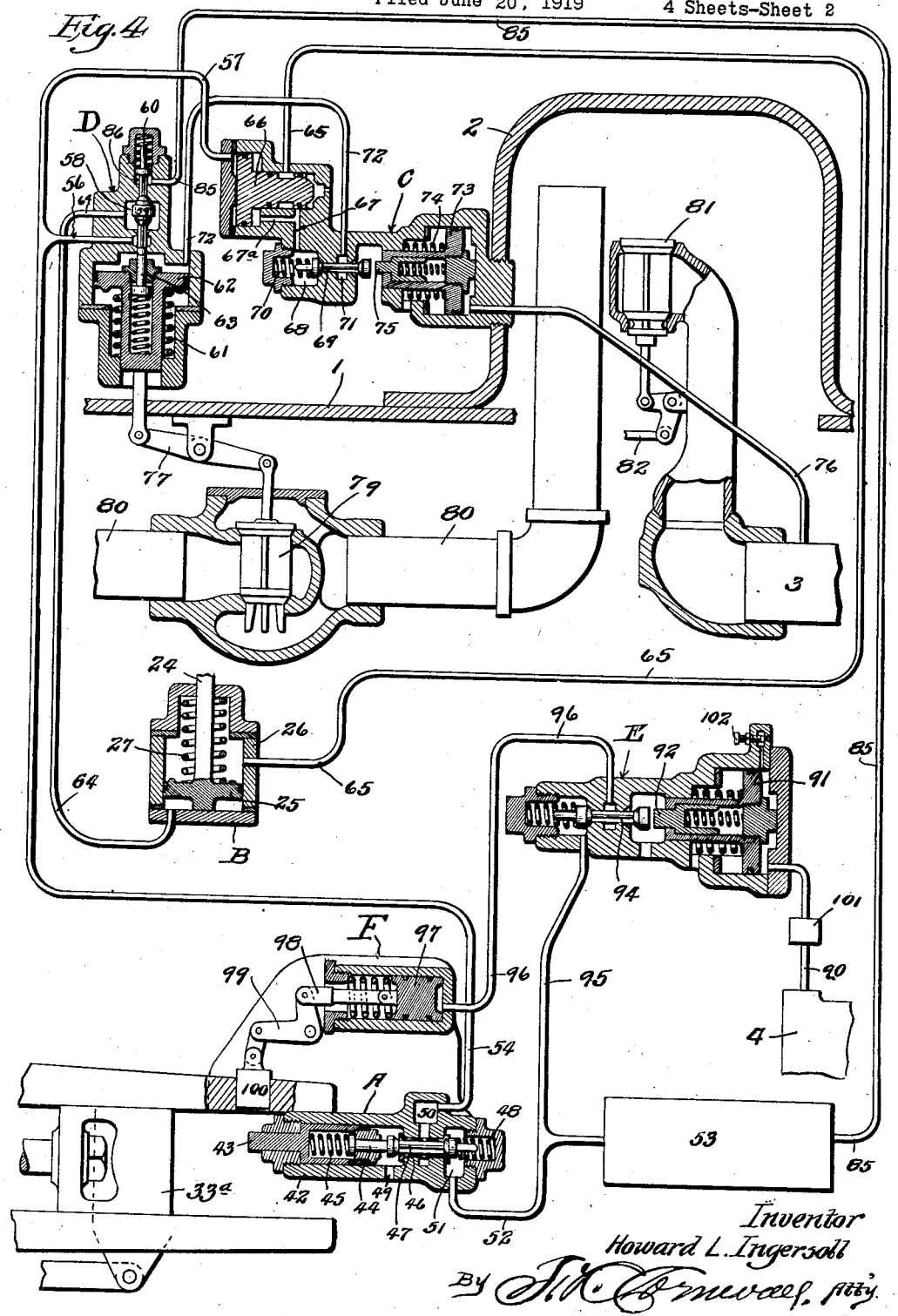

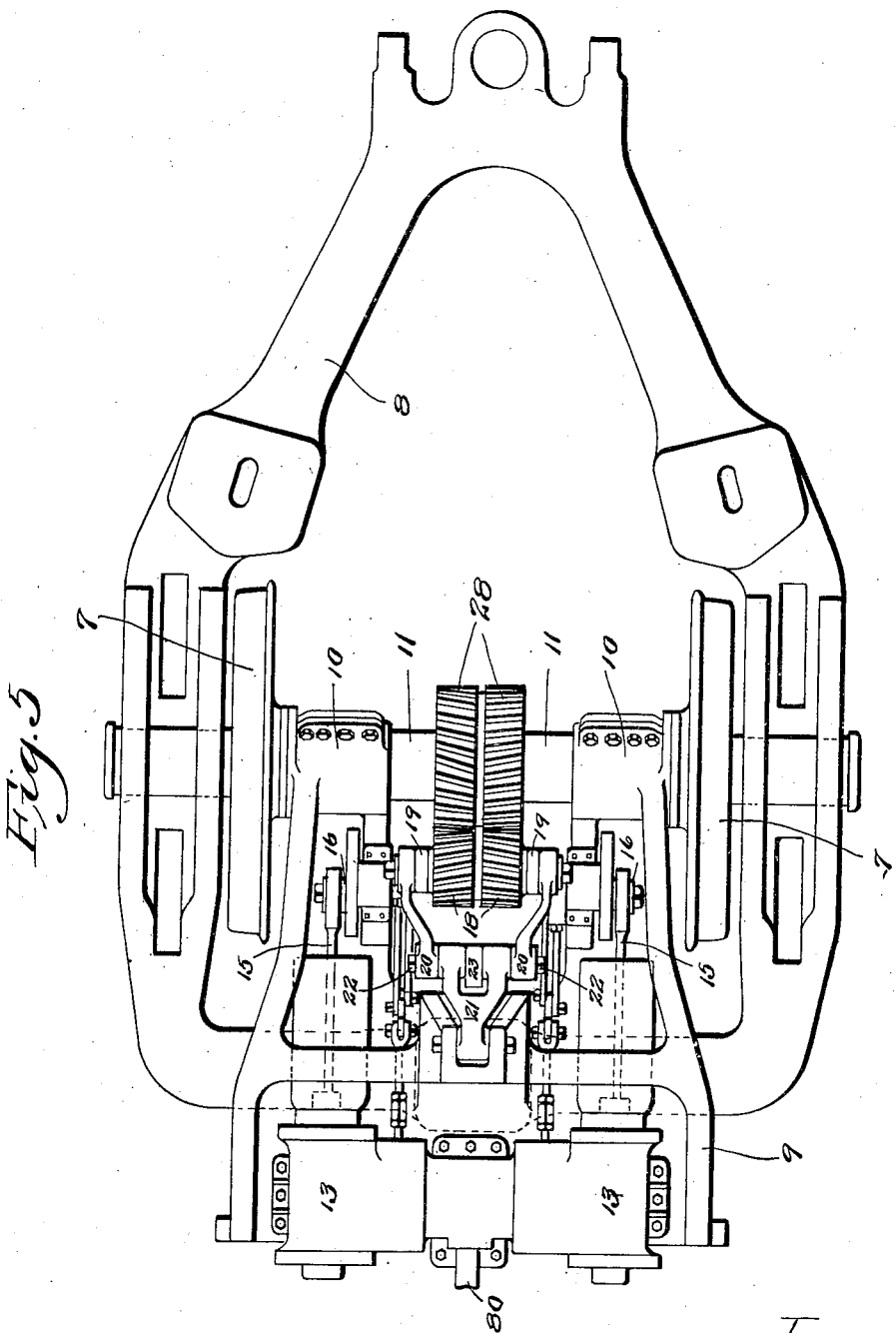

Oct. 9, 1923.

H. L. INGERSOLL 1,470,082

BOOSTER MOTOR FOR LOCOMOTIVES

Filed June 20, 1919 — 4 Sheets-Sheet 4

Inventor
Howard L. Ingersoll
By J. M. Cornwall, Atty.

Patented Oct. 9, 1923.

1,470,082

UNITED STATES PATENT OFFICE.

HOWARD L. INGERSOLL, OF WHITE PLAINS, NEW YORK.

BOOSTER MOTOR FOR LOCOMOTIVES.

Application filed June 20, 1919. Serial No. 305,649.

*To all whom it may concern:*

Be it known that I, HOWARD L. INGERSOLL, a citizen of the United States, residing at White Plains, New York, have invented a certain new and useful Improvement in Booster Motors for Locomotives, of which the following is a full, clear, and exact description, such as will enable others skilled in the art to which it appertains to make and use the same, reference being had to the accompanying drawings, forming part of this specification, in which—

Figure 1 is a conventional view of a locomotive equipped with my booster motor controlling devices.

Figure 2 is a detail view of one of the valves employed in the booster motor controlling mechanism.

Figure 3 is a detail view of a locking mechanism for the controlling valve in the booster controlling system.

Figure 4 is a diagrammatic view of the booster controlling system as a whole showing the parts in the positions which they take when the booster motor is inoperative and disconnected.

Figure 5 is a plan view of the trailer truck and the booster motor.

Figure 6:
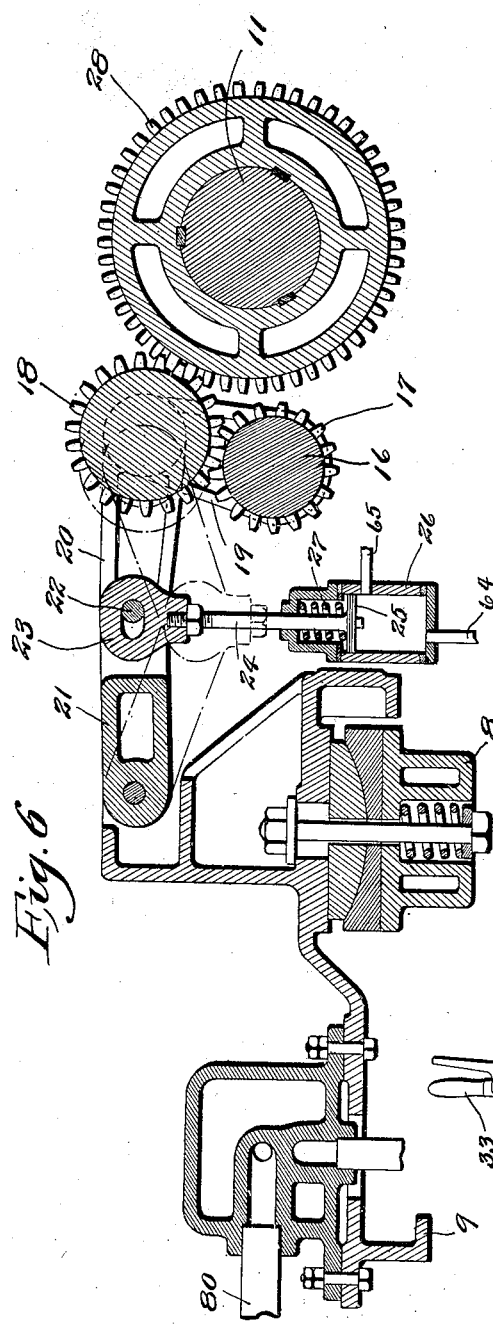
Figure 6 is a vertical longitudinal sectional view through Figure 5, Figures 5 and 6 showing the booster motor operatively connected with the locomotive.
Figure 7:
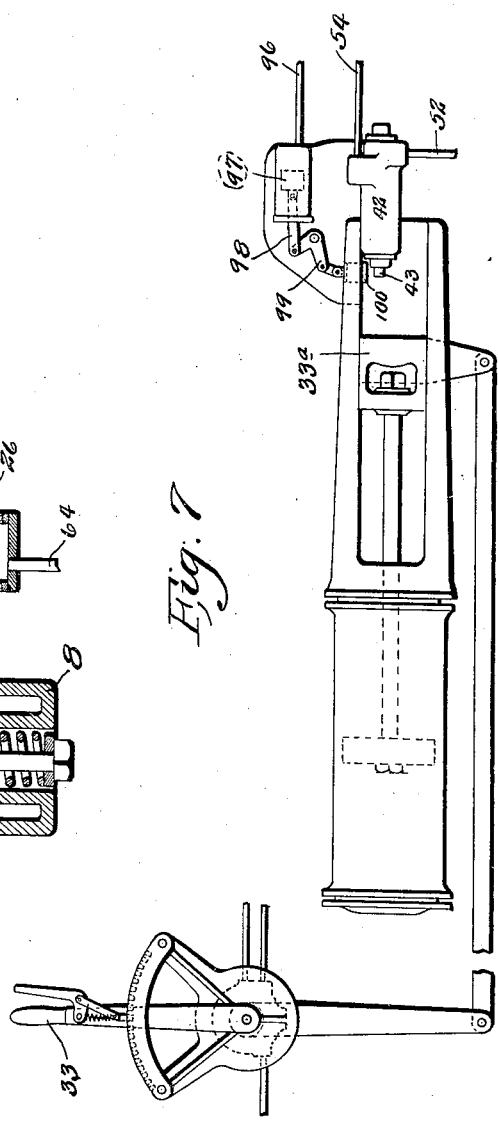
Figure 7 is a detail view of the reverse lever and its controlled parts.

This invention relates to a new and useful improvement in booster motors for locomotives, relating particularly to the controlling means therefor, the same being an improvement upon the controlling means disclosed in companion applications filed by me on May 22, 1919, serially numbered 299,037, and June 6, 1919, serially numbered 302,321.

In the applications just referred to, the control of the booster motor takes place through the manipulation of the controlling devices of the main driving means of the locomotive, namely, the reverse lever and throttle, but the manipulation of the controlling devices for the main driving means is effected to put the booster motor in action only after the engineer has operated an independent releasing device, so that in the arrangements described in these applications the booster motor control is only semiautomatic in the matter of starting the booster. The principal object of my present invention is to provide a controlling mechanism for the booster which is automatic throughout its operation, in the sense, that is, that the booster is put into and out of action through the manipulations of the controlling devices of the main driving means and in accordance with certain running conditions of the locomotive without any special volitional act on the part of the engineer. This scheme of operation involves arrangements whereby, under certain running conditions for example, when the locomotive is running at a speed which would make it dangerous to put the booster in action, the controlling mechanism of the booster is locked in such a way that the booster cannot be put in action by such manipulation of the controlling devices for the main driving means as would cut in the booster in starting the locomotive.

In the drawings, 1 indicates the shell of a locomotive boiler and 2 the steam dome thereof, 3 is the dry steam pipe leading from the steam dome down to the main cylinders 4 of the locomotive. I have conventionally shown the throttle valve 81 which controls the upper end of this dry steam pipe 3, said valve being operated by a rod 82 connected to a throttle lever 83 located in the cab of the locomotive, which lever is operable by the engineer at will.

5 are the main driving wheels of the locomotive, 6 the pilot truck wheels and 7 the trailer truck wheels, the latter being mounted in journal boxes guided by pedestal jaws in the side frame pieces of a trailer truck frame 8.

9 indicates a bed-plate for the booster motor, preferably in the form of a casting, whose forward end is provided with bearings 10, spread apart as shown in Figure 5, to embrace the axle 11 on which the trainer truck wheels are mounted.

The booster motor per se preferably consists of a pair of cylinders 13 in which are arranged pistons connected to cross-heads and operating pitmans 15 which are connected to a crank shaft mounted in bearings on the bed-plate, as disclosed in my companion applications referred to. This crank shaft 16 carries twin skew gears 17 in mesh with corresponding gears 18, the latter being mounted on rock arms 19 pivotally arranged on the crank shaft 16.

20 and 21 are the members of a toggle mechanism connected to the upper ends of the arms 19 and to the bed-plate; pintle bolt 22 forms a hinge connection between the links of the toggle, while an eye 23 pivotally connected to said pintle bolt, is attached to a piston rod 24, having a piston 25 arranged at its lower end operating in a cylinder 26, the parts last named constituting a booster entraining motor designated as a whole by the letter B. A spring 27 arranged above the piston tends at all times to depress the piston rod and break the toggle, moving it to the position shown in dotted lines in Figure 6, wherein the gears 18 are thrown out of mesh with gear 28 arranged on the trailer truck axle 11. A pipe leading from a source of air pressure supply, to be hereinafter described, admits pressure under the piston 25 to raise it and move the gears 18 into mesh with the gear 28. When this pressure is exhausted, the spring 27 disentrains the gears.

Referring now to Figure 4, 33$^a$ indicates the cross-head operated by the reverse lever of the locomotive, and which cross-head serves to position the valve mechanism for the main cylinders of the locomotive. When the reverse lever is thrown forward, (or into the "corner" as it is colloquially expressed), it will position the valve mechanism so that the same will be given the full stroke and the main cylinders of the locomotive receive steam throughout substantially their full stroke. This is the usual practice in starting locomotives. When the reverse lever is pulled rearwardly from its central position, the valve mechanism is so positioned that the locomotive will be driven backwardly. After the reverse lever is positioned forwardly or backwardly, as the case may be, then the throttle valve is operated to admit steam to the main cylinders through the dry steam pipe 3.

In the present instance, the cross-head 33$^a$ controlled by the reverse lever in making its forward stroke is designed to co-operate with the plunger 43 of the controlling device A, which plunger is slidingly arranged in a valve casing 42 and which plunger carries a movable head 44 in its inner end normally held in position by a spring 45 arranged within the plunger 43. 46 is a bushing forming a mount for a double headed valve 47 designed to alternately co-operate with seats at opposite ends of the bushing 46. A spring 48 tends to normally hold valve 47 in position to close the outer seat, and in this position of the valve, the inner head of the valve is unseated and an exhaust port 49 thereby opened from a chamber 50. 51 is the pressure chamber of the valve which is connected by means of a pipe 52 to an air-pressure reservoir 53. Thus, it may be said that pressure is constantly in the chamber 51, and that the chamber 51 is normally blocked or stopped by the outer head of the valve 47 being seated home.

54 indicates a pipe leading from chamber 50, said pipe being divided into two branches, one, 56, leading to a controlling device D which may be designated as the booster throttle valve operating motor and the other, 57, to a controlling device which may be generally designated as "C".

The controller D is formed with a valve chamber 58 containing two connected valves 59 having cruciform stems and designed to be seated, respectively, in the seats in opposite sides of the chamber 58. There is a spring pressed plunger 60 arranged in the upper portion of the valve casing which tends to unseat the upper valve and seat the lower valve. This spring-pressed plunger is opposed by a stronger spring 61 bearing against the underside of a piston 62 having a spring-pressed plunger 63 which engages with the valved end of the double valve 59 and normally holds the lower one of said valves from its seat so that communication is normally established between the pipe 56 and chamber 58. The purpose of providing a spring-pressed plunger 63 is to enable the piston 62 to have a slightly greater stroke than the movement of the double valve 59 so that the upper one of the valves will be held yieldingly to its seat.

Leading from the chamber 58 is a pipe 64 which admits pressure to the underside of the piston 25 to raise it and move the gears 18 into mesh with the gear 28. When this pressure is released the spring 27 disentrains the gears, as above described. After the gears are entrained by the upward movement of piston 25, a port communicating with the pipe 65 is opened so that pressure is permitted to pass through pipe 65 to the controller C. When the pressure is initially admitted into pipe 54, before described, it passes into two branches 56 and 57 referred to, the control of pressure from the pipe 56 having just been described. The pressure from pipe 57 operates to move a valve 66 to establish communication between the port communicating with the pipe 65 and a port 67 in the valve casing. There is a branch port 67$^a$ leading to the inner end of the chamber in which the head of valve 66 operates, but due to the preponderating pressure on the outer face of the head of the valve, said valve will be moved toward the right from the position shown in Figure 4, to establish communication between pipe 65 and port 67 as above described. Pressure from port 67 enters a chamber 68 in which is located one head of a double headed valve 69. This double headed valve has its inner head normally held to its seat by means of a spring 70, hence, no pressure in chamber 68 can pass beyond the valve while the same is thus seated.

71 indicates a chamber in the valve casing with which communicates a pipe 72 leading to the upper end of the cylinder controlling the booster throttle operating mechanism, the upper end of the cylinder being normally in communication with the atmosphere through pipe 72 and chamber 71. 73 is a piston normally held retracted by means of a spring 74, said piston carrying a spring pressed plunger 75 in line with the outer head of valve 69.

In the usual operation of locomotives, the reverse lever 33 is first operated to move the valve mechanism in a direction appropriate to drive the engine forwardly or backwardly, as desired, and when this is done the engineer will admit air pressure into the booster motor controlling system. This pressure, as above described, will be under dual control; first, by the piston 25 of the booster entraining motor B, and which must be operated before the pressure is admitted to the pilot valve "C". The pressure in pilot valve "C" is blocked until such time as the throttle of the main driving mechanism of the locomotive is opened to admit steam through the dry steam pipe 3 to the main cylinders of the locomotive, at which time steam pressure from dry steam pipe 3 passes through a pipe 76 behind piston 73 and moves the same inwardly so as to cause the outer head of valve 69 to close the exhaust from chamber 71 and the inner head of said valve to unseat to establish communication between said chamber 71 and chamber 68, whereby air pressure in chamber 68 will pass into chamber 71 and through pipe 72 to the chamber above the piston 62 forcing the latter downwardly and operating a lever 77 to which it is connected, thereby raising the throttle valve 79 located in the booster motor steam supply pipe 80. The above operative conditions of the booster motor controlling system exist for such period of time as it is desired that the booster motor shall maintain driving relation to its driven axle. In ordinary service conditions, it is preferable to operate the booster motor in connection with the main driving mechanism of the locomotive from a starting position to such time as the main locomotive attains a speed of about twelve miles an hour, when a governing mechanism (not herein shown or described, and which forms no part of the present invention) is brought into play to automatically shut off the steam supply from the booster motor.

Another means of cutting off the steam supply from the booster motor is when the reverse lever is "hooked up", i. e. retrived a notch or two to shorten the stroke of the valves which control the steam supply to the main cylinders of the locomotive. When the reverse lever is thus "hooked up", the plunger in valve mechanism "A" is released and the air pressure cut off from the pipe 54. Valve mechanism "A" also, when its plunger is released, opens an exhaust through chamber 50 and the pressure in pipe 54 and its branches 56 and 57 is now exhausted. The first effect of this exhaust is to permit the piston 66 to be moved by pressure through pipe 65 and ports 67, 67ª to close the port 67 and shut off pressure above the throttle opening cylinder 62.

When the piston 62 rises, it will come in contact with the lower solid end of valve 59 raising it so as to open communication between the chamber below the piston 25, through pipe 64, chamber 58 and pipe 56 to the exhaust chamber in valve "A". Spring 27 will force piston 25 downwardly releasing the clutch and shutting off pipe 65.

In order to utilize direct pressure from the reservoir in sustaining the piston 25 in its raised position, I provide a pipe 85 extending from the main reservoir to a chamber 86 located above the upper head of valve 59 so that when piston 62 is in its lower position and the upper head of valve 59 is unseated, the pressure from pipe 85 will pass through chamber 58 and pipe 64 to the chamber under the piston 25. This direct connection is, of course, closed when the valve 59 is raised.

From the above, it will be observed that when the reverse lever is thrown and operates the plunger, in valve "A", the clutch is first thrown into operative position to entrain the booster motor with its driven axle; the valve C is positioned to admit air pressure to operate the throttle in the dry steam pipe leading to the booster motor; and when the main throttle valve of the locomotive is operated the pressure in the dry steam pipe operating in conjunction with said valve C will admit pressure to operate the throttle valve in the dry steam pipe leading to the booster motor, this sequence of operations insuring first, the clutch connection and then the admission of steam to the booster motor. When the plunger in valve "A" is released and the pressure in pipe 54 and its connections is exhausted, the reverse operation transpires: First the throttle valve in the steam supply pipe to the booster motor is closed so that said motor will either slow down or come to a standstill before the clutch gears are disentrained, i. e., before the pressure is exhausted from under the piston 25.

In order to prevent the untimely operation of the booster motor, as when the reverse lever is fully thrown forward and then "hooked up", I provide controlling devices E, F, the former operated by pressure from the main driving mechanism of the locomotive, preferably taken from pressure in the main cylinders through a pipe 90, which pressure operates on a piston 91, which piston through a spring-pressed plunger 92 opens communication by means of a double-headed valve 94 through pipes 95, 96 to a chamber behind a piston 97 in controlling device F. The piston 97 is connected by a link 98 to a bell crank 99, which in turn is connected to a locking block 100 arranged to be moved into the path of movement of the cross-head 33ª when reverse lever 33 is thrown forward. Cross-head 33ª will operate the plunger 43, and then when the main throttle valve lever is thrown to operate the throttle valve and admit steam to the dry steam pipe 3 and to the main cylinders of the locomotive, the pressure in the main cylinders will operate the piston 91 and the double headed valve 94 so as to admit pressure behind piston 97, dropping the locking block 100 in the path of movement or upon the cross head 33ª. If the cross head 33ª is full forward, the locking block will simply rest thereon in readiness to drop when the reverse lever is "hooked up". If the reverse lever has been "hooked up", then the locking block will be dropped in front of the cross head so that the reverse lever cannot be moved far enough forward to operate the plunger 43. This condition is maintained as long as there is pressure in the main cylinders of the locomotive and in order to avoid the disturbance occasioned by the vacuum created in the cylinders when the locomotive attains a high speed, I arrange a check valve 101 in the pipe 90, and I also provide for a leakage of the pressure behind the piston 91 in the form of an adjustable needle valve 102. In this manner, when there is pressure in the main cylinders of the locomotive either steam pressure or air pressure developed when the locomotive is drifting, the piston 91 is moved against the energy of its restoring spring so that it will operate the valve 94 to admit pressure behind the plunger 97 and either place the locking block in locking position or enable it to be moved into locking position when the reverse lever is "hooked up"; consequently, the reverse lever when "hooked up" cannot be moved forward and operate the plunger 43, and the booster motor controlling system is thus entirely disabled as long as there is pressure in the main cylinders of the locomotive. The needle valve 102 controlling a bleeding port 103 is adjustable to vary the leakage from controlling device E and to thereby determine at what locomotive speed the locking block is moved to its operative position.

*Summary of operation.*—When the engineer starts the locomotive he first puts the reverse lever in the corner and then opens the main throttle valve 81. The movement of the reverse lever to its extreme position brings cross head 33ª against plunger 43 of valve device A, moving the valve thereof to put pipe 54 in communication with pipe 52. Compressed air from tank 53 flows into chamber 58 and also into the chamber at the left hand end (Fig. 4) of piston valve 66 of controller C. From chamber 58 the air passes through pipe 64 to the booster entraining air motor B raising the piston 25 thereof and producing the meshing of gear 18 (Fig. 6) with gear 28 on the locomotive axle 11. As soon as the opening into pipe 65 is uncovered air flows from cylinder 26 through pipe 65 to the controller C and into chamber 68 thereof, piston valve 66 having been moved to the right by pressure from pipe 57. The air is blocked in chamber 68 by valve 69 until the opening of the main throttle valve 81 admits steam from main dry pipe 3 through pipe 76 to the chamber at the right hand side of piston 73. As soon as pressure is thus applied to piston 73 its plunger 75 moves valve 69 to the left and air flows from chamber 68 through pipe 72 to the booster throttle valve operating mechanism D, depressing piston 62 thereof to open the booster throttle valve 79. The downward movement of piston 62 allows valve 59 to be forced to its lower seat by the upper spring which cuts off pipe 64 from pipe 56, but this does not affect the position of the remaining parts of the controlling apparatus, as above described, because air from the tank 53 may now pass through pipe 85 into the pipe 64.

When the locomotive reaches a certain speed the engineer hooks up the reverse lever to shorten the valve movement of the locomotive. This movement withdraws cross head 33ª from plunger 43 and valve 47 moves to shut off pipes 54 and 57 from pipe 52. The pressure in pipe 65 now moves the piston valve 66 to the left, the exhaust at the left hand side of the piston valve taking place through port 49 of the valve A, and the pressure in pipe 65 is cut off from the booster throttle valve operating mechanism D, the piston 62 of which rises under pressure of its spring 61 to close the booster throttle valve 79. Exhaust of the mechanism B takes place through pipe 56, pipe 54 and valve A. Valve 59 is raised against its upper seat by the upward movement of piston 62, closing communication between pipe 85 and pipe 64. This shuts off the air pressure from the entraining motor B and the booster is disconnected from the locomotive axle. When the locomotive attains a certain speed, which may be before or after the reverse lever is hooked back, the pressure developed in the cylinder 4 (either steam pressure or air pressure, if the locomotive is drifting) will be applied to piston 91, moving the same to the left and operating valve 94 to open communication between air pipe 95 and air pipe 96. This admits pressure back of piston 97 to move the blocking device 100 either in the path of the cross head 33ª, if the reverse lever has been hooked back, or against the cross head if the cross head is in contact with plunger 43. In the latter case the blocking device will be interposed between the cross head and plunger 43 as soon as the cross head is retracted by hooking up of the reverse lever. By the arrangements above described the booster once put into action will remain in action until the reverse lever is hooked up but after this has been done and the booster has been cut out it cannot be again cut in so long as the locomotive is running in excess of a certain speed, the mechanism being adjustable to function at different speeds by adjustment of the needle valve 102. Possible damage to the booster in the attempt to connect it to the locomotive when the latter is running at too high a speed is thus obviated.

If the engineer closes the main throttle without hooking back the reverse lever steam will be cut off from the booster but the booster will not be disentrained. By closing the main throttle pressure is cut off from the right hand side of piston 73 and valve 69 thereupon moves to the right, shutting off pipe 72 from pipe 65 and thereby bringing about a closing of the booster throttle. Pressure against the entraining motor B is not affected since the movement of valve 59 against its upper seat opens communication between pipe 56 and pipe 64.

It will be observed that the operation of the apparatus is automatic throughout, in the sense that the booster motor is put into and out of action solely by manipulation of the controlling devices of the main driving means of the locomotive. At the same time the booster motor cannot be entrained except when the locomotive is at a stand still or running at low speeds and the closing of the main throttle valve operates merely to shut off steam from the booster motor without affecting its disengagement from the locomotive axle.

What I claim is:

1. In a controlling mechanism for booster motors for locomotives, the combination of the controlling devices of the locomotive, a booster motor, means for putting said booster motor into action by the manipulation only of the controlling devices of the locomotive, and means operative under speed conditions of the locomotive for preventing the booster motor from being put into operation by the controlling devices of the locomotive.

2. In a controlling mechanism for booster motors for locomotives, the combination of the controlling devices of the locomotive, a booster motor, an air pressure system for controlling the same, and means controlled by the manipulation of the controlling devices only of the driving mechanism of the locomotive for controlling said air pressure system.

3. In a controlling mechanism for booster motors for locomotives, the combination of a booster motor, an air pressure system in control thereof, controlling devices for the locomotive including a moving part, and means automatically moved through operation of the main driving means of the locomotive into the path of movement of said moving part for disabling its control over said booster motor controlling system.

4. In a controlling mechanism for booster motors for locomotives, the combination of a booster motor, an air pressure system in control thereof, means for admitting pressure to the main cylinders of the locomotive, said means including a moving part, and a device operable upon the admission of pressure in a given amount to the main cylinders of the locomotive for disabling the controlling system of the booster motor.

5. The combination with the main driving cylinders of a locomotive and the reverse lever for controlling the valves thereof, of a booster motor, a supply pipe therefor, a throttle valve in said supply pipe, mechanism for operatively connecting said booster motor to wheels of the locomotive and for opening said throttle when the reverse lever is in one extreme position and for closing said valve and disconnecting the booster when the lever is hooked up, and means made effective when the locomotive exceeds a certain speed for blocking the movement of the reverse lever to prevent the booster from being so connected and its throttle valve open by manipulation of the reverse lever.

6. The combination with the main driving cylinders of a locomotive and the reverse lever for controlling the valves thereof, of a booster motor, a supply pipe therefor, a throttle valve in said supply pipe, mechanism for operatively connecting said booster to wheels of the locomotive and for opening said throttle when the reverse lever is in one extreme positoin and for closing said valve and disconnecting the booster when the lever is hooked up, and means actuated by the presence of pressure in one of the main cylinders of the locomotive for preventing the booster from being so connected and its throttle valve opened by manipulation of the reverse lever.

7. The combination with main driving cylinders of a locomotive and the valve mechanism for the same comprising a reverse lever and a moving element controlled thereby, of a booster motor, a supply pipe therefor, a throttle valve in said pipe, mechanism comprising a controlling device adapted to be actuated by said moving element for operatively connecting said booster motor to wheels of the locomotive and for opening said throttle valve when the reverse lever is in one extreme position and for closing said valve and disconnecting the booster when the lever is hooked up, and an obstructing member and means whereby said member is interposed between said moving element and controlling device to prevent the former from actuating the latter when the locomotive exceeds a certain speed and said reverse lever has been hooked up.

8. The combination with the main driving cylinders of a locomotive and the valve mechanism for the same comprising a reverse lever and a moving element controlled thereby, of a booster motor, a supply pipe therefor, a throttle valve in said pipe, mechanism comprising a controlling device adapted to be actuated by said moving element for operatively connecting said booster motor to wheels of the locomotive and for opening said throttle valve when the reverse lever is in one extreme position and for closing said valve and disconnecting the booster when the lever is hooked up, an obstructing member, and means operated by the presence of pressure in one of the main cylinders for causing said member to be interposed between said moving element and controlling device to prevent the former from actuating the latter when the locomotive exceeds a certain speed and said reverse element has been hooked up.

9. The combination with the main driving cylinders of a locomotive and the valve mechanism for the same comprising a reverse lever, a cross head controlled by the reverse lever and guiding means for the cross head, of a booster motor, a supply pipe therefor, a throttle valve in said pipe, mechanism comprising a controlling device adapted to be actuated by said cross head for operatively connecting said booster motor to wheels of the locomotive and for opening the throttle valve when the reverse lever is in one extreme position and for closing said valve and disconnecting the booster when the lever is hooked up, an obstructing device associated with the guiding means for the cross head adapted to bear against the cross head when the latter is in the position corresponding to said extreme position of the reverse lever and to project from said guiding means into the path of said cross head when the reverse lever is hooked up, and means effective when the locomotive exceeds a certain speed for putting said obstructing member into operative position as aforesaid.

10. The combination with the main driving cylinders of a locomotive and the valve mechanism for the same comprising a reverse lever, a cross head controlled by the reverse lever, and guiding means for the cross head, of a booster motor, a supply pipe therefor, a throttle valve in said pipe, mechanism comprising a controlling device adapted to be actuated by said cross head for operatively connecting said booster motor to wheels of the locomotive and for opening the throttle valve when the reverse lever is in one extreme position and for closing said valve and disconnecting the booster when the lever is hooked up, an obstructing device associated with the guiding means for the cross head adapted to bear against the cross head when the latter is in the position corresponding to said extreme position of the reverse lever and to project from said guiding means into the path of said cross head when the reverse lever is hooked up, and a fluid pressure device connected with one of the cylinders of the locomotive for controlling the movements of said obstructing device.

11. The combination with the main driving cylinders of a locomotive, the valve mechanism for the same comprising a reverse lever and a cross head controlled thereby, and the locomotive supply pipe and its throttle valve, of a booster motor, a steam pipe leading thereto provided with a valve, a releasable driving connection between the booster motor and wheels of the locomotive, a compressed air reservoir, a fluid pressure device for making the driving connection between the booster motor and the locomotive effective and for releasing the same, a fluid pressure device for operating the booster valve, controlling means, the operation of which is conditioned upon the opening of the main locomotive throttle for connecting sequentially said fluid pressure devices with said reservoir to first operatively connect the booster to the locomotive and thereafter supply the booster with steam, said mechanism being made effective when the reverse lever is in the corner and operating to cut off steam to the booster and disconnect it from the locomotive, in that order, when the reverse lever is hooked up, said controlling mechanism comprising a pressure operated device actuated by contact therewith of said cross head when the reverse lever is in the corner, an obstructing member adapted to be interposed between said pressure operated device and the cross head when the lever is hooked up, and means responsive to pressure in one of the main cylinders of the locomotive for moving said obstructing device to its obstructing position.

12. The combination with the main driving means of a locomotive and the controlling devices thereof, of a booster motor, controlling mechanism for the same which is actuated by the manipulation only of the controlling devices of the main driving means, and means made effective when the locomotive exceeds a certain speed for preventing the manipulation of the controlling devices for the main driving means from putting the booster motor in action.

13. The combination with the main driving means of a steam propelled locomotive and the controlling devices thereof, of a booster motor, controlling mechanism for the same which is actuated by means of the controlling devices of the main driving means, and means actuated by pressure in the main driving means of the locomotive for preventing the manipulation of the controlling devices of the main driving means from putting the booster motor into action.

14. The combination with the main driving means of a steam propelled locomotive and the reverse lever thereof, of a booster motor controlling mechanism for the same which is actuated by means of the reverse lever of the main driving means, and means actuated by pressure in the main driving means of the locomotive for preventing the manipulation of the reverse lever from putting the booster motor in action.

15. The combination with the main driving means of a locomotive and its controlling devices, of a booster motor having a releasable driving connection with the locomotive to assist the main driving means in starting the locomotive and propelling the same at low speeds, and means for establishing said driving connection and putting said booster motor into operation which is actuated solely by the manipulation of the controlling devices of the main driving means.

16. The combination with the main driving means of a locomotive and its controlling devices, of a booster motor to assist the main driving means in starting the locomotive and propelling the same at low speeds, means for putting said booster motor into operation which is actuated solely by the manipulation of the controlling devices of the main driving means, and means effective after the locomotive has reached a given speed for preventing the manipulation of said controlling devices of the main driving means from putting said booster motor into action.

17. In combination with the main driving means of a steam propelled locomotive, a booster motor adapted to assist the main driving means in starting the locomotive and propelling the same at low speeds, and means actuated through increase of pressure in the main driving means for preventing the booster motor from being put into action.

18. In combination with the main driving means of a locomotive and its controlling devices, a booster motor having a releasable driving connection with the locomotive and controlling means for the same which is actuated by the manipulation of the controlling devices of the main driving means and is actuated solely by said controlling devices to establish said driving connection and put said booster motor in action.

19. The combination with the main driving means of a steam propelled locomotive and its reverse lever and throttle valve, of a booster motor and controlling means therefor, the operation of which is governed by the reverse lever and throttle valve of the main driving means and which is actuatable by the manipulation of said devices alone for putting the booster motor into action.

20. The combination with the main driving means of a steam propelled locomotive and its reverse lever and throttle valve, of a booster motor and controlling means therefor, the operation of which is governed by the reverse lever and throttle valve of the main driving means and which is actuatable by the manipulation of said devices alone for putting the booster motor into action, and means effective after the locomotive has reached a given speed for preventing the booster motor from being put into action.

21. In combination with the main driving means of a steam propelled locomotive and its reverse lever and throttle valve, a booster motor to aid the main driving means in starting the locomotive and propelling the same at low speeds, a compressed air actuated device for establishing and disestablishing a driving connection between the booster motor and an axle of the locomotive, a throttle valve for the booster motor and a compressed air operated device for controlling the same, a source of supply of compressed air, a valve for admitting compressed air to the aforesaid compressed air actuated devices, said valve being operated through the movements of the reverse lever, an obstructing device adapted to obstruct the movement of and thereby prevent the reverse lever from operating said valve, and a fluid pressure actuated device for moving the obstructing device to its operative position which is actuated by the presence of pressure in the main driving means of the locomotive.

22. In combination with the main driving means of a steam propelled locomotive comprising a reverse lever, a booster motor for aiding the main driving means in starting the locomotive and propelling it at low speeds, a controlling mechanism for the booster motor, a member moved by said reverse lever, the position of which governs the operation of said controlling mechanism and means automatically operating under predetermined conditions for preventing the movement of said member to a position to actuate the booster motor.

23. In combination with the main driving means of a steam propelled locomotive comprising a reverse lever, a booster motor for aiding the main driving means in starting the locomotive and propelling it at low speeds, a controlling mechanism for the booster motor, a member associated with the reverse lever for operating the valve gear of the main driving means, the position of which governs the operation of the controlling mechanism and means automatically operating under predetermined conditions for preventing the movement of said member to a position to actuate the booster motor.

24. In combination with the main driving means of a steam propelled locomotive comprising a reverse lever, a booster motor for aiding the main driving means in starting the locomotive and propelling it at low speeds, a controlling mechanism for the booster motor, a member moved by said reverse lever, the position of which governs the operation of said controlling mechanism, and a device adapted to be positioned to block the movement of said member in the direction to actuate said controlling mechanism.

25. In combination with the main driving means of a steam propelled locomotive comprising a reverse lever, a booster motor for aiding the main driving means in starting the locomotive and propelling it at low speeds, a controlling mechanism for the booster motor, a member moved by said reverse lever, the position of which governs the operation of said controlling mechanism, and a blocking device adapted to be automatically moved into the path of said movable member when the locomotive attains a certain speed to prevent the actuation of the controlling mechanism by the reverse lever.

26. In combination with the main driving means of a steam propelled locomotive comprising a reverse lever, a booster motor for aiding the main driving means in starting the locomotive and propelling it at low speeds, a fluid pressure actuating controlling mechanism for the booster comprising a valve A a member moved by the reverse lever for opening said valve to actuate said controlling mechanism and means operating automatically under predetermined conditions for preventing the movement of said member to a position to actuate the booster motor.

27. In combination with the main driving means of a steam propelled locomotive comprising a reverse lever, a booster motor for aiding the main driving means in starting the locomotive and propelling it at low speeds, a fluid pressure actuating controlling mechanism for the booster comprising a valve A and a member moved by the reverse lever for opening said valve to actuate said controlling mechanism, and a blocking device adapted to be automatically positioned in the path of said member when the locomotive attains a given speed.

28. In combination with the main driving means of a steam propelled locomotive comprising a reverse lever, a booster motor the operation of which is conditioned upon the position of said reverse lever, and pressure actuated means controlled by said main driving means adapted at certain speeds of the locomotive to prevent a movement of the reverse lever to a position to put the booster motor in action.

29. In combination with the main driving means of a steam propelled locomotive, a booster motor normally disconnected from the locomotive, and means whereby a driving connection is established between the booster motor and the locomotive and the booster set in operation, automatically, by the manipulation only of the controlling device for the main driving means when said driving means is set in operation.

30. In combination with the main driving means of a steam propelled locomotive, a booster motor normally disconnected from the locomotive, means whereby a driving connection is established between the booster motor and the locomotive and the booster set in operation, automatically, by the manipulation only of the controlling device for the main driving means when the driving means is set in operation, and means whereby the booster may be connected with the locomotive only when the locomotive is at a standstill or moving at relatively low speeds.

31. In combination with the main driving means of a steam propelled locomotive and its reverse and throttle levers, a booster motor normally disconnected from the locomotive, and means whereby a driving connection is established between the booster and the locomotive and the booster is set in operation solely through manipulation of said reverse and throttle levers.

32. In combination with the main driving means of a steam propelled locomotive and its reverse and throttle levers, a booster motor normally disconnected from the locomotive, means whereby a driving connection is established between the booster and the locomotive and the booster is set in operation solely through manipulation of said reverse and throttle levers, and means whereby the booster can be connected with the locomotive only when the latter is at a standstill or moving at relatively low speeds.

33. In combination with the main driving means of a steam propelled locomotive and its reverse and throttle levers, a booster motor normally disconnected from the locomotive, means operated by the manipulation only of the reverse lever for connecting the booster motor with and disconnecting it from the locomotive, and means operated by the throttle lever for starting and stopping the booster.

34. In combination with the main driving means of a steam propelled locomotive and its reverse and throttle levers, a booster motor normally disconnected from the locomotive, means operated by the manipulation only of the reverse lever for connecting the booster motor with and disconnecting it from the locomotive, means operated by the throttle lever for starting and stopping the booster, and means whereby the booster can be connected with the locomotive only when the locomotive is at a standstill or moving at relatively low speeds.

35. In combination with the main driving means of a steam propelled locomotive, a booster motor normally disconnected from the locomotive, and means actuated solely through operation of the main driving means for connecting the booster motor with the locomotive and starting the same and for disconnecting the booster motor from the locomotive and stopping it.

36. In combination with the main driving means of a steam propelled locomotive, a booster motor normally disconnected from the locomotive, means actuated solely through operation of the main driving means for connecting the booster motor with the locomotive and starting the same and for disconnecting the booster motor from the locomotive and stopping it, and means whereby the connection of the booster motor with the locomotive can be established only when the locomotive is at a standstill or moving at relatively low speeds.

37. In combination with the main driving means of a steam propelled locomotive and its controlling devices, a booster motor adapted to be put into action to aid said main driving means and which is put out of action only by manipulation of said controlling devices, and means whereby the booster may be put into action only when the locomotive is at a stand still or running at relatively low speeds.

38. In combination with the main driving means of a steam propelled locomotive and its controlling devices, a booster motor adapted to be put into action, to aid said main driving means, and to be put out of action only by manipulation of the controlling devices of the main driving means, and means whereby the booster motor may be put into action only when the locomotive is at a standstill or running at low speeds.

39. In combination with the main driving means of a steam propelled locomotive and its reverse and throttle levers, a steam propelled booster motor having a throttle valve and a releasable driving connection with the locomotive, and fluid pressure controlling means for the booster comprising the valve A actuated by the reverse lever, the entraining motor B, the mechanism D for operating the booster throttle valve, the controlling device C actuated by steam pressure admitted to the main driving means, and the pressure actuated devices E and F for preventing the actuation of valve A by the reverse lever under certain running conditions of the locomotive.

In testimony whereof I hereunto affix my signature this 16th day of June, 1919.

HOWARD L. INGERSOLL.